United States Patent Office 3,318,045
Patented May 9, 1967

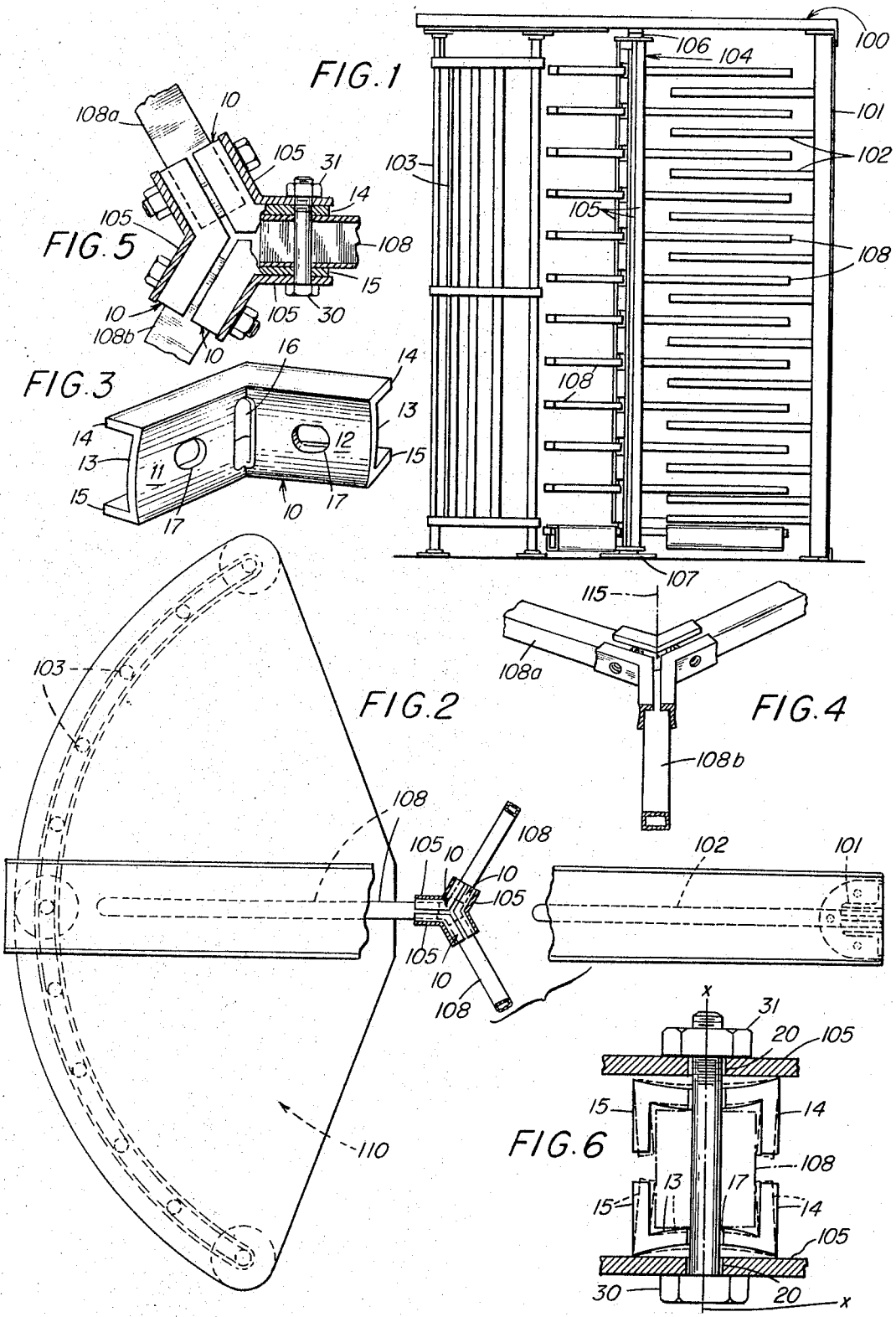

3,318,045
MOUNTING MEANS FOR TURNSTILE ROTOR
William A. Lambertson, Staten Island, N.Y., assignor to Perey Manufacturing Co., Inc., New York, N.Y., a corporation of New York
Filed June 30, 1965, Ser. No. 468,315
2 Claims. (Cl. 49—42)

This invention relates to a mounting means for a turnstile rotor. It is particularly concerned with a mounting bracket for attaching turnstile rotor arms to a turnstile rotor post.

Turnstiles such as are used at places of amusement, transit facilities and other activities wherein large crowds of people must enter and exit from a particular area in a controlled manner are required to be of economical yet durable construction due to the nature of the heavy service to which they are subjected. Of primary importance is the requirement that the arms on the turnstile rotor be connected thereto in a simple, effective and safe manner. It is also essential that the mounting means be such that rapid and simple dismounting of the arms from the rotor can be effected in the event of an emergency.

Another objective is to provide a mounting means for mounting arms on a turnstile rotor which is not subject to wear or loosening and thereby eliminates wobbling or sagging of the rotor arms on the turnstile rotor post after repeated and prolonged service.

Another objective is to provide a means for mounting arms on a turnstile rotor employing a novel bracket serving to support more than one arm on the turnstile rotor.

Another objective is to provide a mounting bracket for mounting the arms on a turnstile rotor which facilitates field installation of turnstiles.

The mounting means of the present invention is characterized by its simplicity of construction, and comprises a mounting bracket having integral branch portions arranged in end-on-end positions but which extend at an angle with each other. Each of the branch portions includes a web and flanges integral therewith which together form a channel for receiving a radial turnstile rotor arm. The webs of the bracket are of concave section and in use are adapted to be mounted with the concave webs juxtaposed with vertically arranged post members of the turnstile rotor. The webs on the bracket are each provided with an opening for receiving a bolt by means of which the bracket is bolted to the post members. The post members of the turnstile rotor preferably have flat surfaces which bear against the ends of the webs so that when the bolts passing through them and the bracket are taken up tight, the webs tend to assume a flattened shape resulting in a bodily pivoting of the bracket side flanges into firm gripping contact with the rotor arms. The gripping contact effected by the flange is of such magnitude that it is virtually impossible for the arms to undergo any longitudinal movement in the channels after long and abusive wear, and the tight gripping action of the side flange also prevents any vertical wobble or sag of the arms on the post. The webs of the bracket also serve the important function of acting as lock washer means in that flattening of the webs, which seek to return to their original arcuate shape, apply a tensioning force on the bolt heads and nuts to prevent any loosening rotation thereof.

The invention will appear more clearly from the following detailed description when taken in conjunction with the accompanying drawings showing by way of example a preferred embodiment of the inventive concept.

In the drawings:

FIGURE 1 is an elevational view of a rotary turnstile wherein is embodied the mounting means of the present invention.

FIGURE 2 is a plan view of FIGURE 1, some parts being broken away to better illustrate the manner of mounting radial arms on the turnstile rotor.

FIGURE 3 is a perspective view of the mounting bracket of the present invention as viewed from the rear side thereof.

FIGURE 4 is a partial perspective view of an assembly of three turnstile rotor arms showing the manner in which the mounting brackets of the present invention connect the arms radially to the turnstile rotor.

FIGURE 5 is a partial plan view, partly in section of the assembly shown in FIGURE 4 of a bank of three radial arms connected together on the supporting members of the turnstile rotor post.

FIGURE 6 is a partial elevational view in section illustrating the manner in which the side flanges of the mounting brackets pivot inwardly for gripping a turnstile rotor arm when a force is applied against the associated web tending to flatten it from its concave or arcuate shape.

Throughout the specification, like reference numerals are used to indicate like parts.

The mounting bracket 10 of the present invention is intended to be used in a rotary turnstile unit 100 of the type illustrated in FIGURE 1. In general, the construction of these units is well known and they are widely used at places of amusement, sports arenas, transit facilities and the like wherein large crowds of people may be required to enter or exit a space in a controlled manner. In brief, the turnstile assembly 100 comprises a cage structure which includes a vertical post 101 at one side whereon is mounted in vertical alignment, a number of fixed arms 102 constituting a barrier. It also includes an arcuate cage liner 103 at the opposite side and defining with the turnstile rotor 104 a space 110 through which a person may walk with a full stride in passing from one side of the turnstile to the other.

The turnstile rotor 104 is comprised of a number of vertical post members 105 which are rotatably supported at the top and bottom of the cage as at 106 and 107 respectively, and to which are connected several rows of radially directed rotor arms 108. The particular embodiment shown in FIGURE 1 is a three-armed rotor type and is intended to operate in a clockwise direction being provided with suitable locking means (not shown) to prevent reverse or counterclockwise rotation of the rotor. The rotor arms 108 of the turnstile are arranged in a plurality of vertical banks of arms, each bank comprising three arms mounted in the same plane. As may be seen, the rotor arms 108 are also arranged in the usual manner in vertically staggered positioning with respect to the corresponding fixed arms 102 for permitting rotation of the rotor arms through the latter.

In the particular embodiment of turnstile illustrated, the turnstile rotor post is comprised of three standards of upright members 105 which are angular in shape as shown, each leg of the angle being preferably a flat surface with the included angle between the legs being substantially 120°, with the standards being symmetrically spaced around the turnstile axis 115 (FIG. 4) so that the legs of one are each parallel with one leg of the others. The standards 105 serve as mounting surfaces to which the rotor arms 108 are connected, this feature being best seen in FIGURE 2.

The mounting bracket 10 of the present invention which may be seen in greater detail in FIGURES 3-6, is preferably a cast member and has integral branch portions 11 and 12 arranged in end-on-end but angled relation with each other. Each branch portion 11 and 12 has a web 13 which has the arcuate shape shown in FIGURE 6, and side flanges 14 and 15 integral with the ends of the web 13, the webs being symmetrically disposed or oriented with respect to a plane x—x (FIG. 6) passing through the web 13 at substantially a right angle thereto. In the illustrated embodiment, the flanges are at approximately a right angle to the plane of the web or parallel with plane x—x. The juncture of the webs of the branch portions has a large slotted opening 16 which it has been found is required to permit the web to deflect or deform from its arcuate shape under the influence of a force tending to flatten it as illustrated, for example, in FIGURE 6. In other words, the absence of the opening 16 at the juncture of the branch portion prevents deformation of the respective webs as they each act as complemental strength members to prevent deflection of the other. The web of each branch portion is also provided with a bolt hole 17 which is somewhat elongated as shown to facilitate alignment with similar holes 20 on the turnstile rotor post members. The slotted opening 16 and bolt holes 17 are preferably cast formed in the bracket.

A feature of the mounting bracket of the present invention is that it is used to provide support for two different arms of each bank of arms in the turnstile rotor. In the embodiment exemplified in the present description, wherein each horizontal bank of turnstile rotor arms comprises three arms, three mounting brackets are used, a branch portion of one bracket providing with the companion branch of the adjacent bracket a radial socket for receiving the inner end of a radial arm. As shown in FIGURE 4, the branch portions 11 and 12 of each mounting bracket 10 receive the ends of two rotors arms 108a and 108b. The arrangement is such that the arms extend at substantially 120° angles with each other. In connecting the arms 108a and 108b to the rotor post standards 105, the latter being bolted by suitable means (not shown) to the top and bottom of the turnstile cage for rotation therein, the mounting brackets are first positioned at the rear or inner sides of their associated standards with the webs of each branch portion juxtaposed with a corresponding flat leg of the standard, the arcuate shape or concavity of each web curving away from the legs as shown. The respective rotor arms are then slipped into the channel portions of each bracket as shown, and a bolt 30 passed through from one side to the other as shown and a nut 31 threaded on the bolt 30. When the bolt 30 is thereafter taken up tight, the branch portions are pulled against their associated standards with the edges of the web in contact with the flat surfaces of the standards. A force couple is thus applied against the webs which tends to flatten them from their arcuate or concave shape to the position shown in dashed lines in FIGURE 6. The flattening of the webs tends to bodily pivot the side flanges inwardly to the positions indicated in dashed lines, thereby causing them to grip the rotor arms with a tight friction bond making it impossible to thereafter move the arms longitudinally in the channels. By thus gripping the rotor arms with the mounting bracket flanges, the bolts are relieved of the stresses such as are applied when a user pushes against the free end of the rotor arms. This force when multiplied by the lever arm length of the rotor arms is of quite some magnitude at the rotor connection end and in prior art turnstiles caused rapid wear and resulting sag or wobble of the arms in their mounting. The latter has been severe enough in some instances to result in the rotor arms striking the barrier arms thus rendering the turnstile unserviceable. Obviously, the web deformation and flange movement has been greatly exaggerated in FIGURE 6 for purposes of clarity. In practice, the actual movement only need be several thousands of an inch. For example, in practice a square rotor arm of 1.5 inches was used in conjunction with a mounting bracket having a maximum distance between the inner faces of the side flanges of 1.5625". The maximum movement each flange could undergo is thus .03125".

A further feature of the invention is that the webs of the bracket also function as lock washer means to prevent loosening of the nuts and bolts used for attaching the brackets to the rotor standards. As the nuts and bolts are taken up on each web, they tend to resist this force and as such apply a tensile stress on the bolt and force the bolt head and nut into a firm contact with the webs and standards which in effect creates a lock washer means therebetween.

It will be seen then from the foregoing description that the mounting bracket of the present invention offers a number of advantages in the construction of rotary turnstile units. They permit the quick and easy assembly of the turnstile rotors in the field and additionally, permit the quick dismounting of the rotor arms in the event of an emergency such as when a rotor jams and it is required to disassemble same to free a person from the cage. Furthermore, the bracket is of a simple construction, is easy to make and its function of gripping the rotor arms tightly when tension is applied to the connecting bolt prevents a loosening of the arms in their mounting after prolonged use.

While there is above disclosed but one embodiment of the mounting bracket of the present invention, it is possible to produce still other embodiments without departing from the scope of the inventive concept herein disclosed, and accordingly it should be understood that all matter contained in the above description or shown in the accompanying drawings should be interpreted as illustrative and not in a limiting sense.

What is claimed is:

1. In a turnstile which includes a plurality of radial arms arranged in vertical rows, a central support comprised of vertical angle plates disposed around the turnstile axis and arranged to present a plurality of pairs of opposed supporting surfaces located at opposite sides of the arms in each vertical row, a corresponding plurality of arm supporting brackets for connecting the arms to said central support, each arm supporting bracket comprising a unitary structure having two branch portions arranged in end-on-end relation but angled with respect to each other and in correspondence with the angle in said vertical plate, each branch portion comprising a web and a pair of flanges depending from opposite sides of said web, one branch of each supporting bracket forming with an oppositely facing branch portion of a companion supporting bracket a radial socket for receiving the end of a radial arm, the supporting brackets being arranged with the webs of the branches thereof in abutment with said supporting surfaces and the flanges gripping the associated radial arm, and bolt means interconnecting each pair of parallel supporting surfaces and extending through the webs of the supporting bracket branches and the radial arm associated therewith, the improvement wherein the webs of said supporting bracket branches are of arcuate section curving outwardly from the supporting surfaces with only the sides of the webs in abutment with said supporting surfaces, the flanges of said branches being parallel spaced from each other and extending generally perpendicular to said supporting surfaces, the webs being sufficiently deformable when subjected to forces tending to flatten them and applied by said supporting surfaces when said bolt means are tightened, to produce bodily pivoting of the flanges in the direction of each other whereby the grip of said flanges on the radial arm associated therewith is increased.

2. The improved turnstile of claim 1 wherein each of said arm supporting brackets is provided at the juncture of the two branch portions thereof with a slotted opening separating the webs of the respective branch portions sufficiently to allow for deformation of each independently of the other.

(References on following page)

References Cited by the Examiner

UNITED STATES PATENTS

| | | | |
|---|---|---|---|
| 1,705,262 | 3/1929 | Mathiesen | 248—121 X |
| 1,945,332 | 1/1934 | Robinson | 248—228 X |
| 2,170,192 | 8/1939 | Gersbach et al. | 49—42 |
| 2,536,394 | 1/1951 | Roberts | 248—229 X |
| 2,579,011 | 12/1951 | Pieper | 287—189.36 X |
| 2,613,052 | 10/1952 | Sellars | 248—229 X |
| 2,838,263 | 6/1958 | Drewrys | 248—226 X |
| 2,891,296 | 6/1959 | Darde. | |

DAVID J. WILLIAMOWSKY, *Primary Examiner.*

HARRISON R. MOSELEY, *Examiner.*

D. L. TAYLOR, *Assistant Examiner.*